Patented Jan. 22, 1952

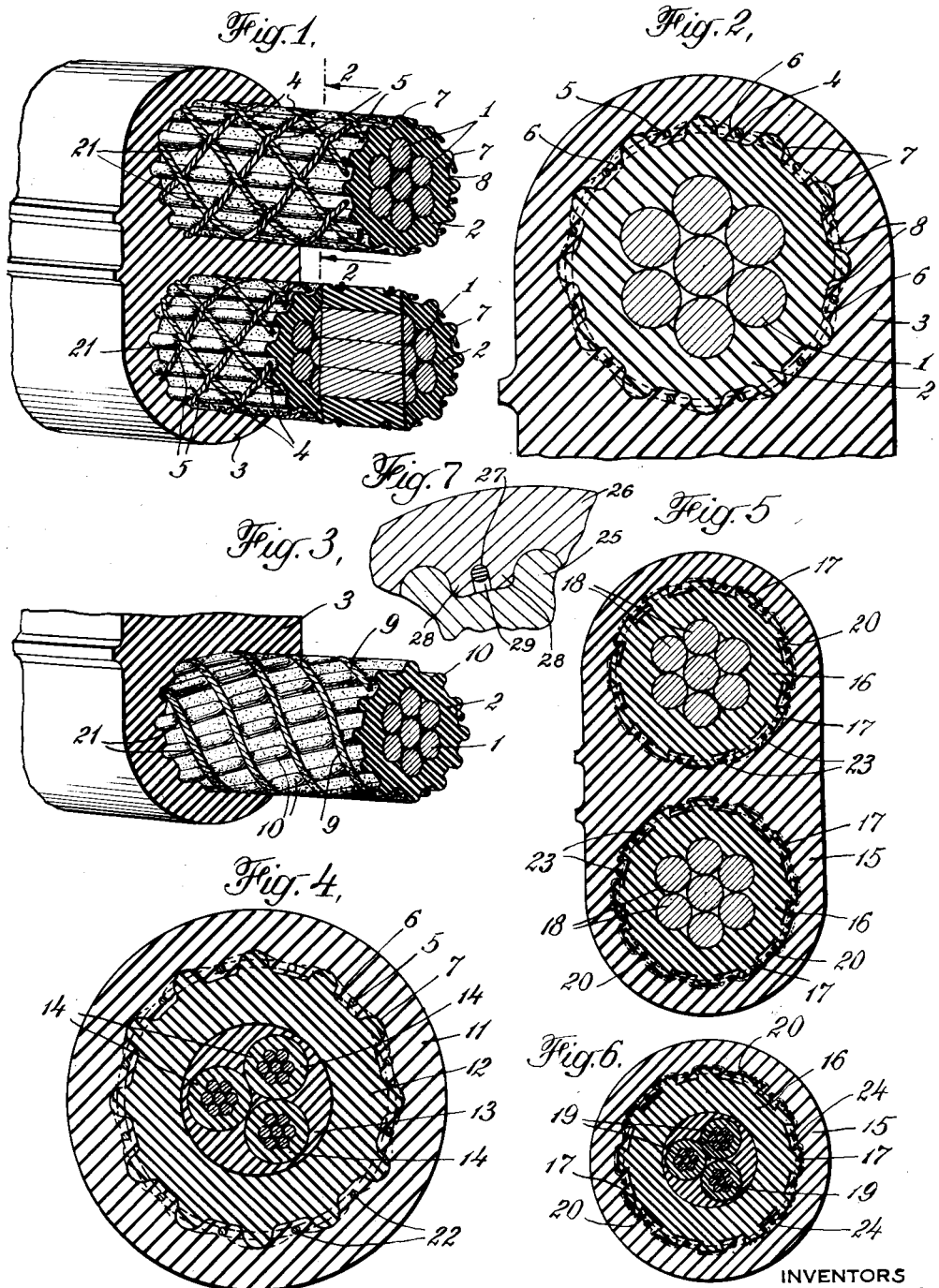

2,583,025

UNITED STATES PATENT OFFICE 2,583,025

INTERLOCKED CABLE INSULATION

Bernard Swift, Melrose, and Norwood D. Kenney, Hingham, Mass., assignors to Simplex Wire & Cable Co., Cambridge, Mass., a corporation of Massachusetts Application August 12, 1949, Serial No. 109,898

9 Claims. (Cl. 174—117)

1

This invention relates to insulated electric cables, and especially to those which are intended to withstand forces or stresses tending to separate adjacent layers or to cause adjacent layers to move with respect to each other.

Insulated electric cables have heretofore been constructed so as to reduce the tendency of adjacent layers to move or to separate with respect to each other. Such constructions have usually included cement interposed between the layers, and have proved only partially effective. However, such expedients do not always satisfactorily prevent the relative movement of adjacent insulating layers in radial, circumferential and longitudinal directions.

In accordance with the present invention any adjacent layers of a cable may be interlocked radially, circumferentially and longitudinally of the cable, so that there can be no relative movement of the layers in any direction. Hence, slipping and twisting, which at times have been troublesome in conventional constructions, will be prevented. Among other improvements resulting from the invention is increased firmness and durability of the jacket, due to the interlocking of the layers.

The construction according to the invention which provides the advantages above outlined, includes locking members secured, respectively, to adjacent layers. These locking members include one or more servings wound over projections or ribs formed on the surface of the inner layer so as to span the intervening grooves, and extension members formed integrally with the outer layer so as to extend into each groove laterally of the serving and, if required, beneath the serving, where it spans the groove. The layers and locking members may be cemented to improve the adhesion. This construction assures contact between adjacent layers in various different planes; and when, as in the embodiments herein described those planes comprise at least three planes mutually at right angles, movement in any direction between adjacent layers is impossible.

The invention will be more readily understood by consideration of the following description together with the drawing, wherein:

Fig. 1 illustrates a cut-away portion of a two-conductor cable, constructed in accordance with one aspect of the invention; which includes parallel longitudinal ribs and multiple servings;

Fig. 2 is a cross-sectional view of one of the insulated conductors of Fig. 1 taken along the line 2—2 thereof;

Fig. 3 illustrates a construction generally simi-

2 lar to that of Fig. 1 but modified in that it includes only a single serving; and the insulation ribs are spiralled;

Fig. 4 is a cross-sectional view of a multi-conductor cable of which the sheath is interlocked with the intermediate layer;

Figs. 5 and 6 illustrate cables constructed fundamentally as in Figs. 3 and 4 but including additional means by which the adjacent layers are interlocked; and Fig. 7 is a fragmentary cross sectional view showing the extension members of the outer layer extending inwardly on opposite sides of the serving.

The cable illustrated in Fig. 1 comprises a two-conductor insulated electric cable of a type especially suited to heavy duty applications such as in connection with mining machinery and the like. It consists essentially of a stranded conductor 1, a layer of conductor insulation 2 around each conductor and an external tough, abrasion-resistant and tear-resistance sheath 3 surrounding the whole. In accordance with the invention the conductor insulation 2 is formed during the extrusion process, or otherwise, so that its external surface is corrugated to comprise alternate ribs 7 and grooves 8 integral with the remainder of the layer. As illustrated, the ribs or spacers comprise an arc of a circle slightly filleted at the base, but ribs of any other desired form may be employed, and they may be interrupted, if desired. The material of the ribbed insulation should be non-rigid, such as rubber insulating compound.

As illustrated in Fig. 1, open servings 4 and 5 of fiber cords or other suitable material, are wrapped in opposite directions around the ribbed insulation spirally, and may be interlaced as shown. Nylon has been found especially advantageous for this purpose. The illustrated ribs are disposed parallel to the longitudinal axis of the cable. The servings should be wrapped under sufficient tension to hold them firmly against the ribs, and preferably the tension should be great enough to form depressions 21 in the ribs, as shown in Figs. 1 and 2. By this means the servings will be firmly secured to the ribbed insulating layer 2. If the serving is applied to the ribbed insulation at the correct tension it may be spaced away from the bottom of each groove where it spans the groove or depression 8 between adjacent ribs, as shown in Fig. 2. As a result of this construction the material of the outer layer will, if applied under proper pressure, not only cover the ribs and servings, but will flow into the grooves making continuous contact therewith and with opposite sides of the serving, and may be caused to pass beneath the servings into the spaces 6 (Fig. 2) between the serving and the bottoms of the grooves 8. Thus, the portions of the layer 3 which extend laterally of the servings even under them in the spaces 6, may be considered as extension or locking members which cooperate with the servings 4 and 5 to interlock the two adjacent layers 2 and 3 together, because these extension members are integral with the layer 3 and the servings are attached to the layer 2. Layers 2 and 3 may be of the same or of different material. In Fig. 1 the cords 4 and 5 are shown as being interwoven, and therefore might be termed "braid" in accordance with certain usage in the art. For convenience the word "serving" is employed herein to mean either woven or not woven.

The construction illustrated in Fig. 3 differs from that of Figs. 1 and 2 in two principal respects, first, only a single open serving 9 is employed, and, second, the ribs 10 are spiralled, preferably in a direction opposite to that of the serving 9. By forming the ribs and grooves spirally, as shown in Fig. 3, there is a longitudinal locking effect between the adjacent layers 2 and 3 in addition to that introduced by the serving 9. In the construction of Fig. 3, as in that of Fig. 1, it is assumed that the serving 9 is applied under sufficient tension to form depressions 21 in the ribs but not so as to touch the bottoms of the grooves. Thus, the layer 3 will be forced into the serving and grooves and perhaps under the serving to provide the interlocking in all directions above described.

The cable construction illustrated in the cross-sectional view of Fig. 4 is a modification of the embodiments above described in that the layers which are interlocked comprise an external sheath 11 and an intermediate layer or jacket 12 which is interposed between the sheath and the filler layer 13. For many types of service it is desirable to employ an intermediate layer 12 of material which has mechanical or electrical characteristics different from those of the covering sheath 11 as well as from those of the filler layer 13. In all cables subjected to mechanical abuse the tendency for the layers to separate is usually greatest between the sheath and the layer adjacent thereto, and this tendency decreases progressively toward the core of the cable. Consequently, the interlocking feature of this invention is, as shown in Fig. 4, introduced between the sheath 11 and the intermediate layer 12. The interlocking members may here be assumed to be the same as shown in Figs. 1 and 2 and include serving 22. Similar interlocking construction and members could be included between layers 12 and 13, if desired. Furthermore, it is obvious that similar interlocking means could be employed between layer 13 and the conductor insulation 14, in which event all four layers would be interlocked as a unit. The advantages of the invention may also be achieved if the ribs are not continuous, in which event the exterior surfaces of the layers 2 and 12, for example, may be provided with interrupted, spaced ribs or projections on which the servings are wound. Copending application of Bernard Swift, Ser. No. 109,899, filed Aug. 12, 1949, is directed to cable constructions including various types of interlocking ribs, both continuous and interrupted, but without the servings.

The modification of the invention illustrated in Figs. 5 and 6 provides certain advantages in addition to those resulting from the embodiments above described. As will be noted from the drawing, the interlocking members here comprise complementary dovetail shaped ribs on the adjacent surfaces of the sheath 15 and the insulating layer 16. A convenient manufacturing procedure is to form the dovetail ribs 17 on the surface of the insulating layer 16, by extrusion or otherwise, around the conductor 18 of Fig. 5 or around the conductors 19 of Fig. 6. Thereafter when the adjacent layer comprising the sheath 15 is formed around the layer 16, the compound may be forced to flow into the dovetail shaped grooves between the ribs 17 with the result that the complementary dovetail shaped ribs 20 integral with the compound of layer 15 will be formed between the ribs 17. The material of the outer layer is frequently physically stronger than that of the inner layer, but the serving reinforces and increases the strength of the weaker inner layer. Thus, the strength of the interlocking is increased, not only because the dovetails themselves interlock, but also because the dovetail shape of the rib introduces more material of the stronger outer layer under the servings 23 of Fig. 5 and 24 of Fig. 6.

The construction illustrated in Fig. 7 shows fragmentarily an inner layer 25, an outer layer 26 and a serving 27 which is wrapped around the inner layer. Extension members 28 of the outer layer extend inwardly on opposite sides of the serving and contact the inner layer leaving an unfilled space 29 immediately radially inwardly of the serving. Thus, movement of the inner layer relative to the outer layer in a longitudinal or a circumferential direction is prevented.

In the illustrations of Figs. 5 and 6, the interlocking dovetailed ribs are illustrated between the contacting surfaces of the sheath and the layer adjacent to it. However, as above described in connection with the preceding figures, the interlocking dovetail configuration may be employed between any two adjacent layers, and may, if desired, be combined in the same cable with the servings shown in the other figures. In the appended claims, the phrase "around (or 'surrounding') the conductor" is intended to include layers adjacent or not adjacent the conductor. Likewise, the reference in the claims to "a conductor" is not intended as a limitation of the number of conductors in any particular cable to which this invention is applied, because the present invention has no relation to the number of conductors employed.

We claim:

1. In an insulated cable, an electric conductor, an inner layer of non-conducting insulating material surrounding said conductor, an outer protective sheath of a flexible, abrasion resistant material adjacent to said inner insulating layer, interlocking spacers of complementary configurations about the interfaces between the outer sheath and the adjacent inner insulating layer which form a plurality of contact areas lying in different planes, and at least one serving of a fibrous material wrapped in a taut helical manner about said inner insulating layer and in contact with a plurality of said spacers in each circumferential turn of the serving, said outer protective sheath enclosing said serving along its length where the serving is not in contact with said adjacent insulating layer, thereby preventing radial motion between said outer sheath and said adjacent inner insulating layer.

2. In an insulated cable, an electric conductor, an inner layer of non-conducting insulating material surrounding said conductor, an outer protective sheath of a flexible, abrasion resistant material adjacent to said inner insulating layer, alternate ribs and grooves disposed about the circumferential surface of said inner insulating layer and formed integrally therewith, at least one serving of fibrous material wrapped in a helical manner about said inner insulating layer and in contact therewith at said ribs but spanning said grooves, said outer sheath having spaced interlocking extensions fashioned in a form complementary to said ribs and grooves and enclosing said serving where it spans said grooves, thereby preventing radial and circumferential motion between said outer sheath and said adjacent inner insulating layers.

3. In an insulated cable, an electric conductor, an inner layer of non-conducting insulating material surrounding said conductor, an outer protective sheath of a flexible, abrasion resistant material adjacent to said inner insulating layer, alternate ribs and grooves disposed about the circumferential surface of said inner insulating layer and formed integrally therewith, at least one serving of a fibrous material wrapped in a helical manner about said inner insulating layer and in contact therewith at said ribs, which ribs are depressed at such point of contact, said serving spanning the grooves of said inner insulating layer, and said outer flexible sheath having spaced interlocking extensions fashioned in a form complementary to said ribs and grooves and enclosing said serving where it spans said grooves, thereby preventing longitudinal, radial and circumferential motion between said outer sheath and said adjacent inner insulating layers.

4. In an insulated cable, an electric conductor, an inner layer of non-conducting insulating material surrounding said conductor, an outer protective sheath of a flexible, abrasion resistant material adjacent to said inner insulating layer, longitudinal alternate ribs and grooves disposed about the circumferential surface of said inner insulating layer and formed integrally therewith, at least one serving of a fibrous material wrapped in a helical manner about said inner insulating layer and in contact therewith at said ribs, which ribs are depressed at such point of contact, said serving spanning the grooves of said inner insulating layer, and said outer flexible sheath having spaced interlocking extensions fashioned in a form complementary to said ribs and grooves and enclosing said serving where it spans said grooves, thereby preventing longitudinal, radial and circumferential motion between said outer sheath and said adjacent inner insulating layers.

5. In an insulated cable, an electric conductor, an inner layer of non-conducting insulating material surrounding said conductor, an outer protective sheath of a flexible, abrasion resistant material adjacent to said inner insulating layer, a series of helical alternate ribs and grooves disposed about the circumferential surface of said inner insulating layer and formed integrally therewith, at least one serving of a fibrous material wrapped in a helical manner counter said helical ribs about said inner insulating layer and in contact therewith at said ribs, which ribs are depressed at such point of contact, said serving spanning the grooves of said inner insulating layer, and said outer flexible sheath having spaced interlocking extensions fashioned in a form complementary to said ribs and grooves and enclosing said serving where it spans said grooves, thereby preventing longitudinal, radial and circumferential motion between said outer sheath and said adjacent inner insulating layers.

6. In an insulated cable, a conductor, an inner layer surrounding the conductor, spacers integral with and extending outwardly from the surface of said inner layer, an open serving wound upon said spacers and supported in spaced relation to the surface of said inner layer, an outer layer adjacent to and surrounding said inner layer, and interlocking extension members integral with said outer layer and extending on opposite sides of said serving inwardly through the openings defined by said serving and said spacers, said extension members being in contact with the inner layer and filling at least the spaces on opposite sides of said serving to provide at least circumferential and longitudinal interlocking of said layers.

7. An insulated cable according to claim 6, in which said extension members extend beneath the serving and fill the spaces immediately radially inwardly of said serving to provide radial interlocking of said layers.

8. A cable according to claim 6, in which said spacers comprise non-rigid ribs integral with said inner layer, said serving being wound under tension across said ribs so as to form depressions therein.

9. A cable according to claim 6, in which said spacers comprise first dovetail-shaped ribs integral with the outer surface of said inner layer and said extension members comprise second dovetail-shaped ribs integral with the inner surface of said outer layer, the ribs of said outer layer and of said inner layer being respectively spaced apart to form dovetail-shaped grooves which complement the ribs of said inner layer and of said outer layer, respectively.

BERNARD SWIFT.
NORWOOD D. KENNEY.

REFERENCES CITED

The following references are of record in the file of this patent:

UNITED STATES PATENTS

| Number | Name | Date |
| --- | --- | --- |
| 839,381 | Greenfield | Dec. 25, 1906 |
| 998,827 | Armstrong | July 25, 1911 |
| 1,698,704 | Middleton et al. | Jan. 8, 1929 |
| 1,977,209 | Sargent | Oct. 16, 1934 |
| 2,294,919 | Lunsford | Sept. 8, 1942 |
| 2,455,773 | Johnson | Dec. 7, 1948 |